March 15, 1960 R. A. KOOLHOF 2,928,897

SYSTEM FOR THE RADIOGRAPHIC TRANSMISSION OF TELEGRAMS

Filed Feb. 29, 1956 3 Sheets-Sheet 1

INVENTOR
REGNERUS AGINUS KOOLHOF

BY [signature]

AGENT

March 15, 1960 R. A. KOOLHOF 2,928,897

SYSTEM FOR THE RADIOGRAPHIC TRANSMISSION OF TELEGRAMS

Filed Feb. 29, 1956 3 Sheets-Sheet 2

INVENTOR
REGNERUS AGINUS KOOLHOF

BY [signature]
AGENT

SYSTEM FOR THE RADIOGRAPHIC TRANSMISSION OF TELEGRAMS

Filed Feb. 29, 1956 3 Sheets-Sheet 3

INVENTOR
REGNERUS AGINUS KOOLHOF

BY Fred M Vogt
AGENT

United States Patent Office 2,928,897

Patented Mar. 15, 1960

2,928,897

SYSTEM FOR THE RADIOGRAPHIC TRANSMISSION OF TELEGRAMS

Regnerus Aginus Koolhof, Hilversum, Netherlands, assignor, by mesne assignments, to North American Philips Company, Inc., New York, N.Y., a corporation of Delaware Application February 29, 1956, Serial No. 568,675

Claims priority, application Netherlands March 2, 1955

2 Claims. (Cl. 178—69)

This invention relates to systems for the radiographic transmission of telegrams from a first station to a second station.

Systems of this kind are already known in which the second station comprises a device for testing the incoming signals or elements and in which upon reception of a distorted signal or element, a warning signal is sent back to the first station under the control of said device, the first station thus automatically repeating a predetermined number of signals or elements. In such systems the telegraph signals are transmitted in a form such that, at the receiving end, a mutilation resulting, for example, from atmospheric interference or fading, may be found. For this purpose the signals may be coded in a suitable manner and may each comprise, for example, three positive and four negative elements. If the incoming signal does not satisfy this requirement, the test device determines mutilation. Furthermore, it is possible for the work and rest elements to be transmitted via different frequency channels, in which event in the case of a distorted element a signal must always be received either via one channel or via the other. If a signal is received at the same time via each channel, for example as a result of atmospheric interference, or, if no signal is received via either of the two channels, for example as a result of fading, the test device rejects the element concerned.

The object of the invention is to improve the output of such a system. In the system according to the invention, the telegraph signals are transmitted simultaneously via different channels, the test device testing the signals received via each channel and comparing them with one another. Furthermore, the system is such that the warning signal is sent back to the first station only if a distorted signal or element is received via each channel and if two non-distorted incoming signals or elements are of opposite polarities.

It is to be noted that it is known per se, in order to decrease the effect of fading, to transmit telegraph signals simultaneously via different channels and to select the strongest incoming signal at the receiving end. It is possible, for example, to transmit the signals either via different frequency channels, or via the same frequency channel and to arrange a plurality of receiving aerials with associated radio-receivers at suitable distances from one another.

Figure 1:
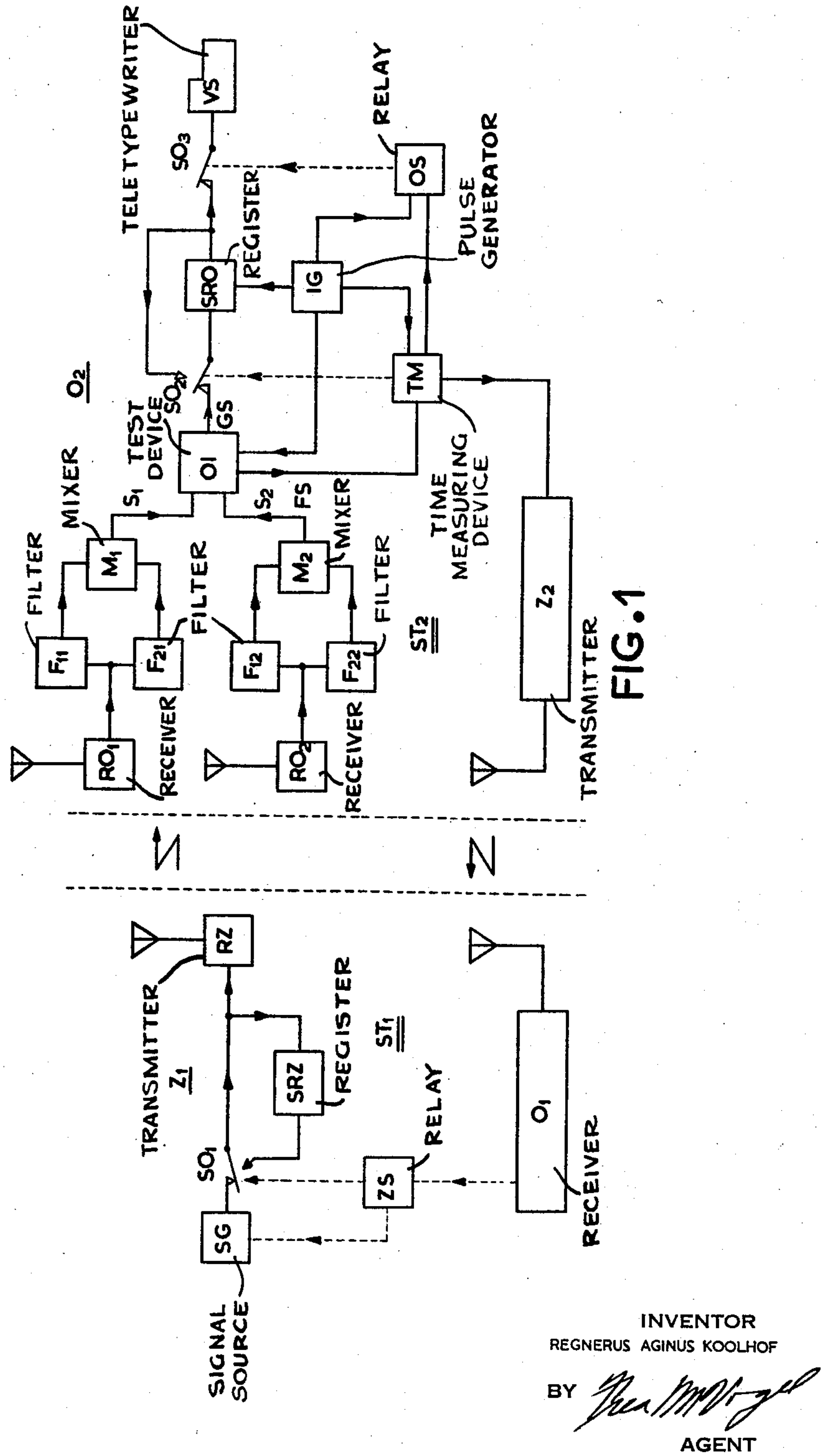
Figure 2A:
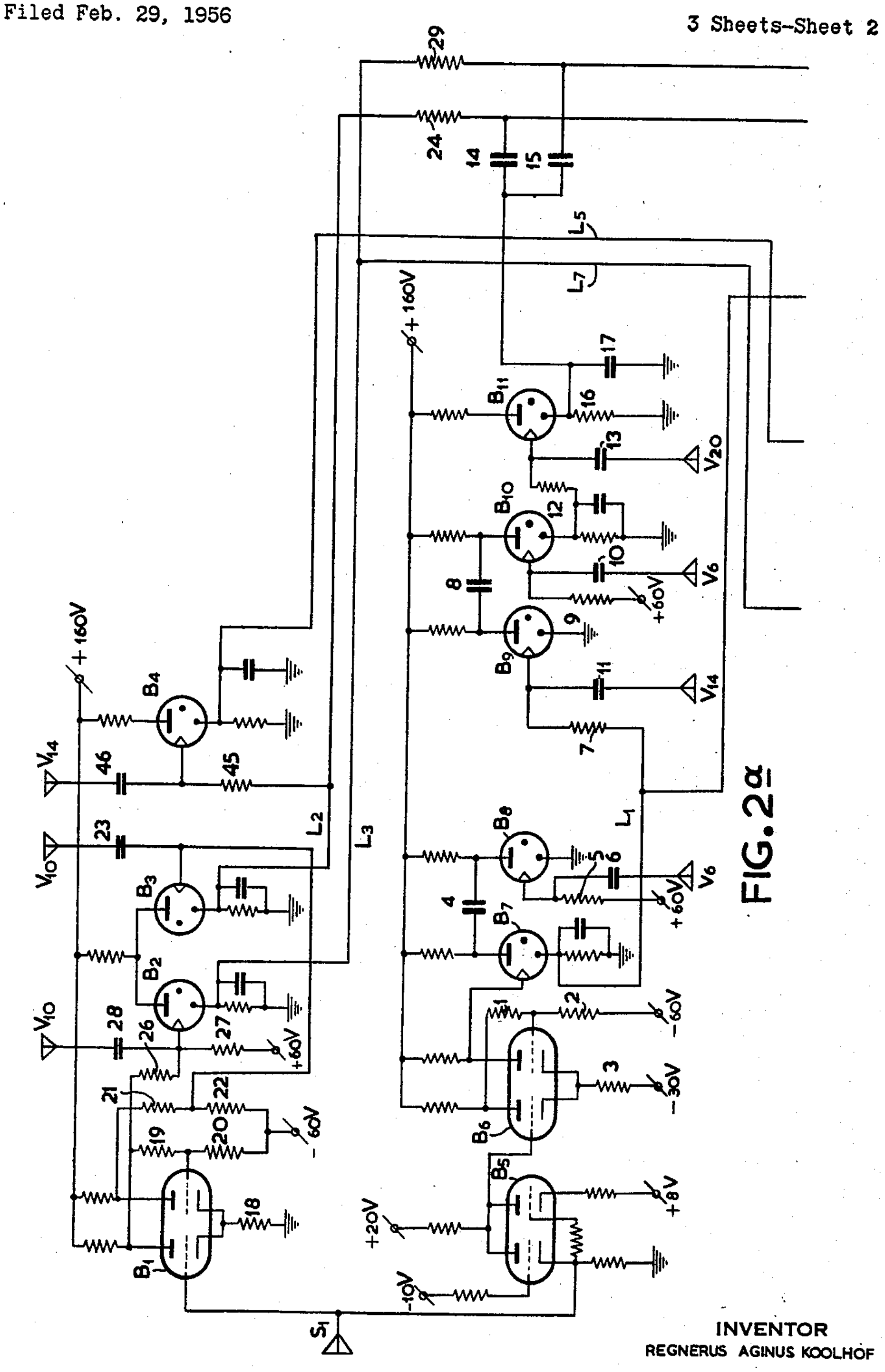
Figure 2B:
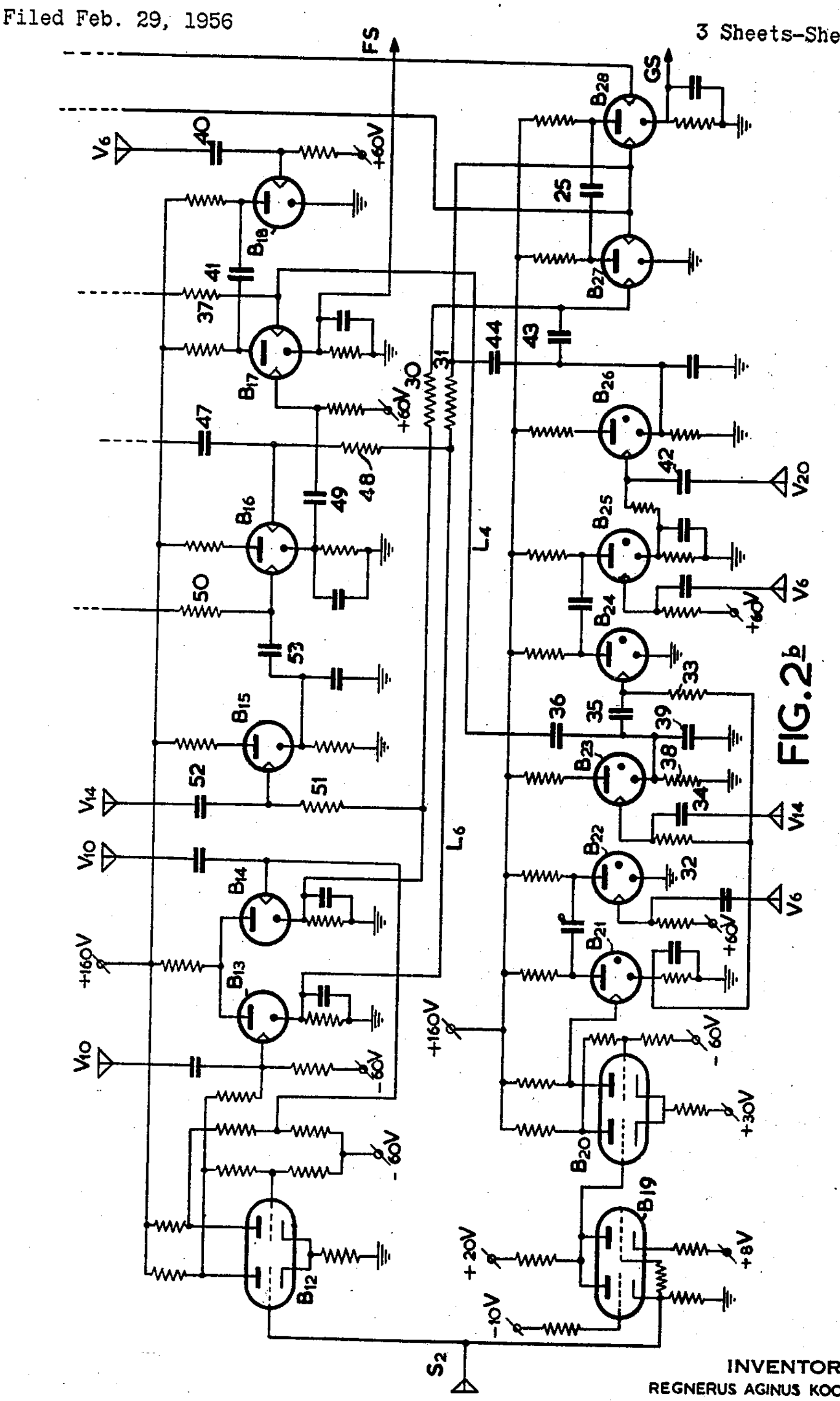

In order that the invention may be readily carried into effect, it will now be described, by way of example with reference to the accompanying drawings, in which:

Fig. 1 shows one embodiment of a telegraph system according to the invention, and Figs. 2*a* and 2*b*, which must be imagined to be placed against one another, show an embodiment of a test device for use with this telegraph system.

Fig. 1 shows diagrammatically two stations ST1 and ST2, which co-operate with one another. The stations each comprise a transmitter Z1 and Z2, respectively, and a receiver O1 and O2, respectively. For the transmission of telegrams from station ST1 to station ST2, the transmitter Z1 co-operates by radiographic means with the receiver O2. The signals are supplied in the station ST1 by a signal source SG, for example a punchband transmitter, and supplied via the backcontact of a switching member SO1 to a radio-transmitter RZ and also to the input of a register SRZ, which may be, for example, of the shifting or sliding type, or it may be a tape recorder. The work and rest elements modulate the transmitter RZ with different sideband frequencies *f1* and *f2*, respectively, the transmitter thus being modulated at any time either with the frequency *f1* or the frequency *f2*. The radio signals are received in the station ST2 by two radioreceivers RO1 and RO2, of which the associated receiving aerials are arranged at a certain distance from one another. The low-frequency output voltages of the wireless receivers RO1 and RO2 are supplied to frequency-selective channels F11, F21 and F12, F22 respectively. The channels F11 and F12 comprise band-pass filters which pass the frequency *f1* and the channels F21 and F22 comprise band-pass filters which pass the frequency *f2*. The output voltages of the channels F11 and F21, after rectification, are supplied to a mixing device M1, which subtracts these voltages from one another so as to obtain a positive output voltage, when the side-band frequency *f1* is received, and a negative output voltage when the side-band frequency *f2* is received. Normally only one of the side-band frequencies *f1* and *f2* is received. If the two side-band frequencies *f1* and *f2* are present at the same time, for example as a result of atmospheric interference, or if the two frequencies are absent simultaneously, for example as a result of fading, the absolute value of the output voltage of mixing device M1 is lower than a predetermined threshold value, which implies that the relative element is received with distortion. The output voltages of the frequency-selective channels F12 and F22 are supplied in a similar manner to a mixing device M2. The mixing devices M1 and M2 may each consist of the well-known subtracting circuit in which the two input signals are fed to the grid and cathode, respectively, of an amplifier tube, whereby the polarity of one of these input signals becomes reversed at the output of the amplifier. The output voltages of the mixing devices M1 and M2 are supplied via conductors S1 and S2 to a test device OI, the operation of which will be explained hereinafter with reference to Figs. 2*a* and 2*b*. The test device OI tests these voltages and compares them with one another, transmitting the signal to a receiving register SRO, which is, for example, of the shifting or sliding type, or a tape recorder, via a conductor GS and the back contact of a switching member SO2. The register is so designed that the voltages supplied to its input are supplied to the output with a retardation time equal to the duration of a whole telegraph signal. The output voltage of the receiving register is supplied via a switching member SO3 to a teletypewriter VS. The switching members SO1, SO2 and SO3 are shown as mechanical contacts, but it is preferable in practice to utilise electronic switching means.

As previously mentioned, the test device OI, compares the output voltages of the mixing devices $M_1$ and $M_2$ and transmits a rest element or a work element to the receiving register SRO, if the element concerned is received without distortion by at least either of the receivers RO1 and RO2. However, if the element is received with distortion via both receivers, or if the incoming elements satisfy the requirements imposed, but are opposite to one another, the test device OI is responsive and transmits a signal to a time-measuring device TM, which immediately thereafter switches over the switching member SO2 into the operating position, so that the input of the receiving register is disconnected from the test device OI and connected to the output of the register, so that the element received with distortion is not given off to the register and the signal elements already taken up by the register keep circulating in it until the switching member SO2 again assumes the rest position. The time-measuring device TM is a pulse counter, and is connected to a pulse generator IG to count the pulses produced therein. The duration of the signal elements is 20 msecs. The pulse generator IG, which is synchronised with the transmitter Z1 in a manner not shown supplies every 20 msecs. a pulse to the time-measuring device TM, which counts said pulses and after a time equal to the duration of two whole telegraph signals, switches over the switching member SO2 to its rest position. At this moment, the receiving register SRO again occupies exactly the same position as at the moment when the connection with the test device OI was interrupted. When the test device OI is responsive, the time-measuring device TM also supplies a signal to the transmitter Z2, which thereupon transmits a warning signal to the station ST1, for example, by mutilating the signals transmitted at this moment from the station ST2 to the station ST1, as a sign that an element has been received with distortion. The receiver O1 responds thereto, similarly as the receiver O2, in the manner already described and the test device associated with receiver O1 now transmits a signal to the device ZS of the transmitter Z1, which device may be a self-timing relay which remains operative for a period of two whole telegraph signals. Thus, the device ZS interrupts the transmission of signals from the signal source SG and switches over the switching member SO1 to its operating position during a time equal to the duration of two whole telegraph signals. The transmitter Z1 thereupon automatically repeats the signal elements transmitted last, which have been registered by the transmitting register SRZ. Said elements are thus received again in the receiver O2 after a time equal to the duration of two telegraph signals, the element which was received with distortion the first time being again received at a moment when the receiving register SRO occupies exactly the same position as the first time. The signal element thus are always taken up in the receiving register SRO in the correct sequence and the registered elements are thus all of them approved by the test device OI. It has been found that the supply of signal elements to the receiving register SRO may be interrupted for a certain period. However, it is desirable that the elements associated with the same signal should be supplied to a teletypewriter VS in direct sequence. If a distorted signal element is received and the supply of new elements to the receiving register SRO is interrupted at a moment when the receiving register transmits a telegraph signal to the teletypewriter VS, the signal must nevertheless be transmitted completely. The receiver SO2 is thus of a design such that the switching member SO3 is opened only after the transmission of a signal to the teletypewriter VS is terminated completely, the member being closed again when the subsequent signal can be transmitted to the teletypewriter. The switch SO3 is operated by a time-controlled relay OS which is connected to the time-measuring device TM so that the time of operation is controlled thereby.

The test device OI will now be described more fully with reference to Figs. 2*a* and 2*b*.

The output voltages of the mixing devices M1 and M2 are received by the device OI via conductors S1 and S2. The device OI tests the quality of the signal received via the wireless receiver RO1 by means of a first circuit including vacuum double triodes B5, B6 and gas-filled tubes B7, B8, B9, B10 and B11, and the quality of the signal received by the wireless receiver RO2 is tested by a second circuit including vacuum double triodes B19, B20 and gas-filled tubes B21, B22, B23, B24, B25 and B26. The second circuit is substantially of the same design as the first circuit, except that the second circuit includes an additional tube B23. The polarity of the first signal is tested by a third circuit including a vacuum triode B1 and gas-filled tubes B2, B3 and B4, the polarity of the second signal being tested by means of a fourth circuit including a vacuum triode B12 and gas-filled tubes B13, B14 and B15, which fourth circuit is exactly of the same design as the third circuit. Tube B16 serves to ascertain the fact, that a signal element is received via the two wireless receivers RO1 and RO2 with distortion, whereas the tubes B17 and B18 serve to compare the polarities of the signal elements received via the two channels. The elements approved by the test device are transmitted by tubes B27 and B28 to the output conductor GS.

The signal elements received via either of the two channels are approved by the test device, if the absolute value of the voltage received, via conductor S1 or S2 lies above a determined threshold value for a period of 8 msecs., i.e. between 6 msecs. and 14 msecs., after the beginning of the signal element, so that any distortion of the flanks of the signal elements is disregarded. The polarity of an element is tested 10 msecs. after the beginning, that is to say exactly at the centre of the element. The different moments are marked by pulses supplied by the pulse generator IG to the test device 6, 10, 14 and 20 msecs. after the beginning of a signal element, via conductors indicated by V6, V10, V14 and V20 in Figs. 2*a* and 2*b*. The tubes B5 and B19 serve to derive from the input voltages supplied via the conductors S1 and S2 output voltages which are independent of the polarity of these input voltages. Conductor S1 is connected to the cathode of the lefthand triode of tube B5 and to the control grid of the right-hand triode. The control grid of the left-hand triode and the cathode of the right-hand triode each have a biassing potential such that both triodes are cut off, if the voltage of conductor S1 is zero. The voltage of the anodes of said triodes is then 20 volts, that is to say has a comparatively high value. If the voltage of conductor S1 is positive, the right-hand triode of tube B5 is conducting and if the input voltage is negative, the left-hand triode is conducting. In either case, the voltage on the anodes is lower than the maximum value and is dependent upon the absolute value of the input voltage. The anodes of the two triodes are connected to the control grid of the left-hand triode of tube B6. The control grid of the right-hand triode of tube B6 is coupled by way of a potentiometer 1, 2 to the anode of the left-hand triode. The cathode circuit of the two triodes includes a common resistor 3.

The anode of the right-hand triode is connected to the ignition electrode of gas-filled tube B7. The anode of this tube is connected via a capacitor 4 to the anode of gas-filled tube B6, which, together with tube B7, thus constitutes a trigger circuit, that is to say, when one tube is ignited, the other tube extinguishes as a result of the negative pulse supplied via capacitor 4. The ignition electrode of tube B6 receives via resistor 5 a biassing potential of 60 volts. This voltage is slightly lower than the ignition voltage.

The pulse generator IG supplies a pulse to the ignition electrode of tube B8, via conductor V6 and capacitor 6, 6 msecs. after the beginning of each signal element, so that the voltage of this electrode exceeds the striking voltage and tube B8 is ignited, if it was not already conducting. At this moment, corresponding to the beginning of a test period, tube B7 is at any rate extinguished. If the signal element concerned satisfies the requirements imposed, the absolute value of the voltage of conductor S1 is higher than a predetermined threshold value and the anodes of the triode of tube B5 have a comparatively low voltage during the test period. The left-hand triode of tube B6 is then cut off and the right-hand triode is conducting, so that its anode voltage is lower than the ignition voltage of tube B7. If the signal element concerned satisfies the requirements imposed, tube B7 remains extinguished during the whole test period and conductor L1, which is connected to the cathode of tube B7, has a voltage equal to earth potential at the end of this period, that is to say 14 msecs. after the beginning of the signal element. The ignition electrode of tube B9 is connected via conductor L7 and resistor 7 to the cathode of tube B7. The anode of tube B9 is connected via capacitor 8 to the anode of tube B10, so that the two tubes, similarly as the tubes B7 and B8, constitute a trigger circuit such that, when one tube is ignited, the other tube is extinguished. The ignition electrode of tube B10 is connected via resistor 9 to a voltage source of 60 volts and receives a pulse from the pulse generator IG 6 msecs. after the beginning of the signal element, that is to say at the beginning of the test period, via conductor V6 and capacitor 10, so that tube B10 is ignited if it should not already be conducting. Tube B9 is thus at any rate extinguished at the beginning of the test period. If the tested element is received with distortion, tube B7 is ignited, as mentioned before, during the test period, so that the ignition electrode of tube B9 receives via conductor L1 and resistor 7 a high biassing potential such that tube B9 is ignited by the pulse supplied via conductor V14 and capacitor 11 to the ignition electrode 14 msecs. after the beginning of the signal element, that is to say at the end of the test period. Tube B10 is in this case extinguished at the end of the test period and the ignition electrode of tube B11, which is coupled via resistor 12 to the cathode of tube B10, then has a low biassing potential such that tube B11 cannot be ignited by the pulse supplied via conductor V20 and capacitor 13 to the ignition electrode at the end of the signal element. However, if the signal element is received without distortion, tube B9 remains cut off, as mentioned before, and tube B10 is conducting at the end of the signal element, so that the ignition electrode of tube B11 receives a high biassing potential such that this tube is ignited. This is a sign that the signal element concerned has been approved. Tube B11 extinguishes independently, since the cathode resistor 16 is bridged by capacitor 17. When tube B11 is ignited, the capacitors 14 and 15 transfer a positive pulse to the right-hand ignition electrodes of tubes B27 and B28. The biassing potentials of these ignition electrodes are dependent upon the polarity of the signal concerned, which polarity is tested by the tubes B1, B2 and B3. The triodes of tube B1 are included in a trigger circuit. The cathodes are connected to earth via a common resistor 18 and the control grid of the right-hand triode is coupled via a potentiometer 19, 20 to the anode of the left-hand triode. If the signal voltage supplied via conductor S1 is positive, the left-hand triode is conducting and the right-hand triode is cut off, so that the ignition electrode of gas-filled tube B3, which is coupled via a potentiometer 21, 22 to the anode of the right-hand triode of tube B1, receives a comparatively high biassing potential and tube B3 is ignited by the pulse supplied via conductor V10 and capacitor 23 to the ignition electrode 10 msecs. after the beginning of the signal element concerned, at least if this tube were not already conducting before, in other words, the preceding element had also been positive. When tube B3 is ignited, tube B2 extinguishes, the anode of which is connected to the anode of tube B3. The right-hand ignition electrode of tube B27 then receives a positive biassing potential via conductor L2 and resistor 24, so that tube B27 is ignited if a positive pulse is supplied via capacitor 14 to the ignition electrode concerned. When tube B27 is ignited, tube B28 extinguishes as a result of the negative pulse supplied via capacitor 25 to the anode of tube B28. Conductor GS then supplies a comparatively low biassing potential to the receiving register SRO of Fig. 1 as a sign that an approved rest element has been received. However, if the signal voltage supplied via conductor S1 is negative, the left-hand triode of tube B1 is cut off and the ignition electrode of tube B2, which is coupled via a potentiometer 26, 27 to the anode of the left-hand triode, receives a comparatively high biassing potential, so that gas-filled tube B2 is ignited when a pulse is supplied via conductor V10 and capacitor 28 to the ignition electrode 10 msecs. after the beginning of the signal element. Conductor L3 then supplies via resistor 29 a high biassing potential to the right-hand ignition electrode of tube B28, so that this tube is ignited when a positive pulse is supplied via capacitor 15 to its ignition electrode. Conductor GS then supplies a comparatively high potential to the receiving resistor SRO of Fig. 1 as a sign that an undistorted work element has been received.

The circuits for testing the signal voltage supplied via conductor S2 are of a similar design. The tubes B12, B13 and B14 correspond to the tubes B1, B2 and B3. If the signal voltage is positive, gas-filled tube B14 is ignited and the left-hand ignition electrode of tube B27 receives a high biassing potential via resistor 30. If the signal voltage is negative, tube B13 is ignited and the left-hand ignition electrode of tube B28 receives a high biassing potential via resistor 31.

The tubes B19, B20 and B22 correspond to the tubes B5, B6, B7, B8 and the tubes B24, B25 and B26 correspond to the tubes B9, B10 and B11.

If the signal element supplied via conductor S2 is distorted, gas-filled tube B21 is ignited in analogy with tube B7, so that the ignition electrodes of the gas-filled tubes B23 and B24, which ignition electrodes are connected via resistors 32 and 33 to the cathode of tube B21, receive a comparatively high biassing potential. Tube B23 is then ignited at the end of the test period under the action of the pulse supplied via a capacitor 34 to its ignition electrode, a capacitor 35 transmitting a positive pulse to the ignition electrode of tube B24, as a result of which this tube is also ignited. Conductor L4 transmits via capacitor 36 a positive pulse to the right-hand ignition electrode of tube B17. If the signal element concerned were at the same time also received with distortion via the other channel, gas-filled tube B7 would also have been ignited and a high biassing potential would be supplied via conductor L1 and resistor 37 to the right-hand ignition electrode of tube B17, causing this tube to be ignited under the action of the pulse supplied. Consequently, the potential of conductor FS increases, so that the time-measuring device TM of Fig. 1 is operated in the manner already described for transmitting a warning signal to the station ST1. The tube B23 extinguishes independently, its cathode resistor 38 being shunted by capacitor 39. Tube B18 is ignited 6 msecs. after the beginning of the subsequent signal element under the action of the positive pulse supplied via capacitor 40 to its ignition electrode, tube B17 then extinguishing as a result of the negative pulse supplied via capacitor 41 to its anode.

If the signal element supplied via conductor S2 is not distorted, the tubes B23 and B24 are not ignited and tube B25 remains conducting, so that at the end of the signal element tube B26 is ignited under the action of the pulse supplied via capacitor 42 in analogy with tube B11. The capacitors 43 and 44 then transmit a positive pulse to the left-hand ignition electrodes of tubes B27 and B28, as a result of which either of the tubes B27 and B28 is ignited, dependent upon a high biassing potential which tube has supplied to its left-hand ignition electrode via resistor 30 or 31 in the manner already described. If the polarity of the signal element concerned is equal to that of the preceding element, the corresponding tube naturally remains conducting.

Four different cases may occur. Firstly, the signals received via the two channels are distorted. In this case tube B17 is ignited in the manner already described 14 msecs. after the beginning of the signal element. The time-measuring device TM of Fig. 1 thus can switch over the switching member SO2 to its operating position before the end of the signal, i.e. before the elements registered in the receiving register SRO are shifted. Secondly, an element may be received with distortion via one channel only. In this case, either of the tubes B27 and B28 is rendered conducting described in the manner in conformity with the polarity of the undistorted channel. If an element is received without distortion via both channels and the test device OI finds the same polarity, then also either of the tubes B27 and B28 is ignited in conformity with this polarity. Finally, it is possible that a signal element which is apparently undistorted is received via the two channels, but that the polarities are opposite.

In this case a question for repetition must also be sent to the station ST1. Tube B18 compares the polarities of the signal elements. If the polarity of the signal supplied via conductor S1 is positive, tube B3 is ignited in the manner already described, so that the ignition electrode of tube B4, which is connected via resistor 45 to the cathode of tube 3, receives a high biassing potential and tube B4 is ignited 14 msecs. after the beginning of the signal element under the action of the positive pulse supplied via capacitor 46, a positive pulse being transferred via conductor L5 and capacitor 47 to the right-hand ignition electrode of tube B16. If the pulse supplied via conductor S2 at the same time has negative polarity, tube B13 is ignited and the right-hand ignition electrode of tube B16 receives a comparatively high biassing potential via conductor L6 and resistor 48, so that tube B16 is ignited by the action of said pulse. Capacitor 49 transfers a positive pulse to the left-hand ignition electrode of tube B17, so that this tube is also ignited and conductor FS assumes a high potential such that the time-measuring device TM of Fig. 1 is made operative for transmitting a question for repetition to the station ST1.

The tubes B4 and B16 extinguish independently, their cathode resistors being shunted by capacitors.

If the signal supplied via conductor S1 has negative polarity, tube B2 is ignited and conductor L7 supplies via resistor 50 a high biassing potential to the left-hand ignition electrode of tube B16. If the signal received via conductor S2 at the same time has positive polarity, tube B14 is ignited, so that the ignition electrode of tube B15 has supplied to it a high biassing potential via resistor 51 and tube B15 is ignited by the action of the pulse supplied via capacitor 52, 14 msecs. after the beginning of the signal element. Capacitor 53 then transfers a positive pulse to the left-hand ignition electrode of tube B16, so that this tube is ignited, followed by tube B17, so that conductor FS again assumes a comparatively high potential.

What is claimed is:

1. A telegraphy transmission system comprising a sending station adapted to transmit the work elements of a telegraph signal at a first frequency and the rest elements of said telegraph signal at a second frequency, and a receiving station comprising two different channels for receiving the telegraph signals transmitted from said sending station, each of said channels comprising a first filter for passing said work elements, a second filter for passing said rest elements, and two subtractive mixers connected respectively to the outputs of said filters, and a testing circuit connected to the outputs of said mixers and adapted to produce a warning signal in the event that the signal received in each of said channels is mutilated.

2. A telegraphy transmission system comprising a sending station and a receiving station, said receiving station comprising at least two independent channels connected to receive the same signals from said sending station, testing circuit means connected to each of said channels to compare the signals received by said channels, said testing circuit means comprising polarity responsive means connected to provide an output signal when the polarities of said received signals are opposite, and distortion responsive means connected to provide an output signal only when the signals received by each of said channels are distorted, and warning means associated with said testing means and connected to transmit a warning signal to said sending station upon the occurrence of one of said output signals.

References Cited in the file of this patent

UNITED STATES PATENTS

| | | |
|---|---|---|
| 2,119,196 | Bakker et al. | May 31, 1938 |
| 2,512,038 | Potts | June 20, 1950 |
| 2,700,756 | Estrems | Jan. 25, 1955 |
| 2,702,380 | Brustman et al. | Feb. 15, 1955 |
| 2,813,149 | Cory | Nov. 12, 1957 |
| 2,827,623 | Ainsworth | Mar. 18, 1958 |